United States Patent
Kanai

(10) Patent No.: US 7,193,746 B2
(45) Date of Patent: Mar. 20, 2007

(54) IMAGE PROCESSING DEVICE IMAGE PROCESSING METHOD, AND RECORD MEDIUM

(75) Inventor: Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 934 days.

(21) Appl. No.: 10/180,963

(22) Filed: Jun. 27, 2002

(65) Prior Publication Data

US 2003/0035157 A1 Feb. 20, 2003

(30) Foreign Application Priority Data

Jun. 28, 2001 (JP) ............................ 2001-196396

(51) Int. Cl.
*G06K 15/00* (2006.01)
*H04N 1/46* (2006.01)

(52) U.S. Cl. .................... 358/1.9; 358/2.1; 358/520; 358/530

(58) Field of Classification Search ................ 358/1.9, 358/2.1, 509, 530, 520; 382/274
See application file for complete search history.

(56) References Cited

U.S. PATENT DOCUMENTS

| | | | | |
|---|---|---|---|---|
| 5,502,580 A | * | 3/1996 | Yoda et al. | 358/518 |
| 5,539,540 A | * | 7/1996 | Spaulding et al. | 358/518 |
| 6,729,954 B2 | * | 5/2004 | Atsumi et al. | 463/7 |
| 2002/0045470 A1 | * | 4/2002 | Atsumi et al. | 463/1 |
| 2003/0030718 A1 | * | 2/2003 | Maeda | 347/250 |
| 2003/0035157 A1 | * | 2/2003 | Kanai | 358/518 |
| 2003/0053088 A1 | * | 3/2003 | Kanai et al. | 358/1.9 |
| 2003/0193677 A1 | * | 10/2003 | Zeng | 358/1.9 |

FOREIGN PATENT DOCUMENTS

| | | |
|---|---|---|
| JP | 8-32828 | 2/1996 |
| JP | 08-324027 | 12/1996 |
| JP | 10-210275 | 7/1998 |
| JP | 10-229500 | 8/1998 |
| JP | 11-146209 | 5/1999 |
| JP | 11-341296 | 10/1999 |
| JP | 2001-086356 A | 3/2001 |
| JP | 2001-238091 | 8/2001 |
| JP | 02003018415 | * 1/2003 |
| JP | 02003018416 | * 1/2003 |

* cited by examiner

*Primary Examiner*—Jerome Grant, II
(74) *Attorney, Agent, or Firm*—Lowe Hauptman & Berner, LLP

(57) ABSTRACT

An image processing apparatus includes a color correction table, which provides a color conversion amount according to lightness L based on a color conversion amount for white ($\Delta Lw$, $\Delta uw$, $\Delta vw$), and uses this color correction table for desired color correction. The color correction table decreases the color conversion amount to approximately zero when the lightness is less than a predetermined value Lmin. Also, the color correction by the color correction table is conducted such that a color point is moved toward a direction which maintains the lightness, or such that the color point is moved toward a direction which increases the lightness.

10 Claims, 10 Drawing Sheets

○ Color in Target Color Space after Conversion (L*u*v*)

◆ Color of Projector to be Associated (Ld*ud*vd*)

IMAGE PROCESSING DEVICE IMAGE PROCESSING METHOD, AND RECORD MEDIUM

BACKGROUND OF THE INVENTION

1. Field of the Invention

The present invention relates to image processing applied to an image input signal so as to convert a color space of the image input signal to a color space of an image output apparatus.

2. Description of the Prior Art

Devices such as a scanner, a monitor, a printer, and a projector individually have different color reproduction gamuts. Thus, it is a problem how to reproduce a color while absorbing the difference in the color reproduction gamut.

For example, when color characteristics of a liquid crystal projector are matched to a color standard such as sRGB, first, it is necessary to consider how to reproduce target color characteristics (a color matching method) within the color gamut of the liquid crystal projector by comparing color gamuts of both of them.

SUMMARY OF THE INVENTION

However, since a color standard such as sRGB is generally created based on color characteristics of a CRT display, when the color gamut of the projector, which has greenish color characteristics, and the color gamut of the sRGB are compared, there is difference in hue of gray (the direction of the gray axis) from white to black. As a result, when the target color characteristics are reproduced with high fidelity in the color gamut of the liquid crystal projector (color matching with priority to color reproduction), though the color characteristics of the liquid crystal projector may be precisely matched to the target color characteristics, since a high luminance gamut neighboring white is not used after the color matching, there is such a problem that an output image becomes darker. On the other hand, when the color matching has priority to the brightness, since a color close to white after the conversion simply uses a color of the liquid crystal projector, though the brightness is not sacrificed, there is such a problem that the color matching degrades accordingly.

The present invention is devised to solve the problem described above, and has a purpose of providing an image processing apparatus, an image processing method, a program, and a storage medium which can reproduce color characteristics close to target color characteristics as a whole while a high luminance color reproduction gamut of an image output apparatus is efficiently used.

According to the present invention, an image processing apparatus for conducting a desired color correction by using a color correction table, includes a color correction table for providing a color conversion amount according to lightness based on a color conversion amount of white.

According to the present invention, the color conversion amount decreases as the lightness decreases.

According to the present invention, the color conversion amount decreases based on a quadratic function as the lightness decreases.

According to the present invention, the color conversion amount becomes approximately zero when the lightness decreases less than a predetermined value.

According to the present invention, the predetermined value is less than or equal to 50 when the lightness of white is 100.

According to the present invention, the color correction by the color correction table is conducted such that a color point is moved toward a direction so as to maintain the lightness.

According to the present invention, the color correction by the color correction table is conducted such that a color point is moved toward a direction so as to increase the lightness.

According to the present invention, an image processing method for conducting a desired color correction by using a color correction table provides a color conversion amount according to lightness based on a color conversion amount of white.

According to the present invention, a computer-program of instructions for execution by the computer to perform an image processing for conducting a desired color correction by using a color correction table provides a color conversion amount according to lightness based on a color conversion amount of white.

According to the present invention, a computer-readable medium stores the computer-program.

According to the present invention, a computer-readable medium stores a color correction table for providing a color conversion amount according to lightness based on a color conversion amount of white.

DETAILED DESCRIPTION OF THE PREFERRED EMBODIMENTS

The following section describes a preferred embodiment of the present invention while referring to drawings.

Figure 1:
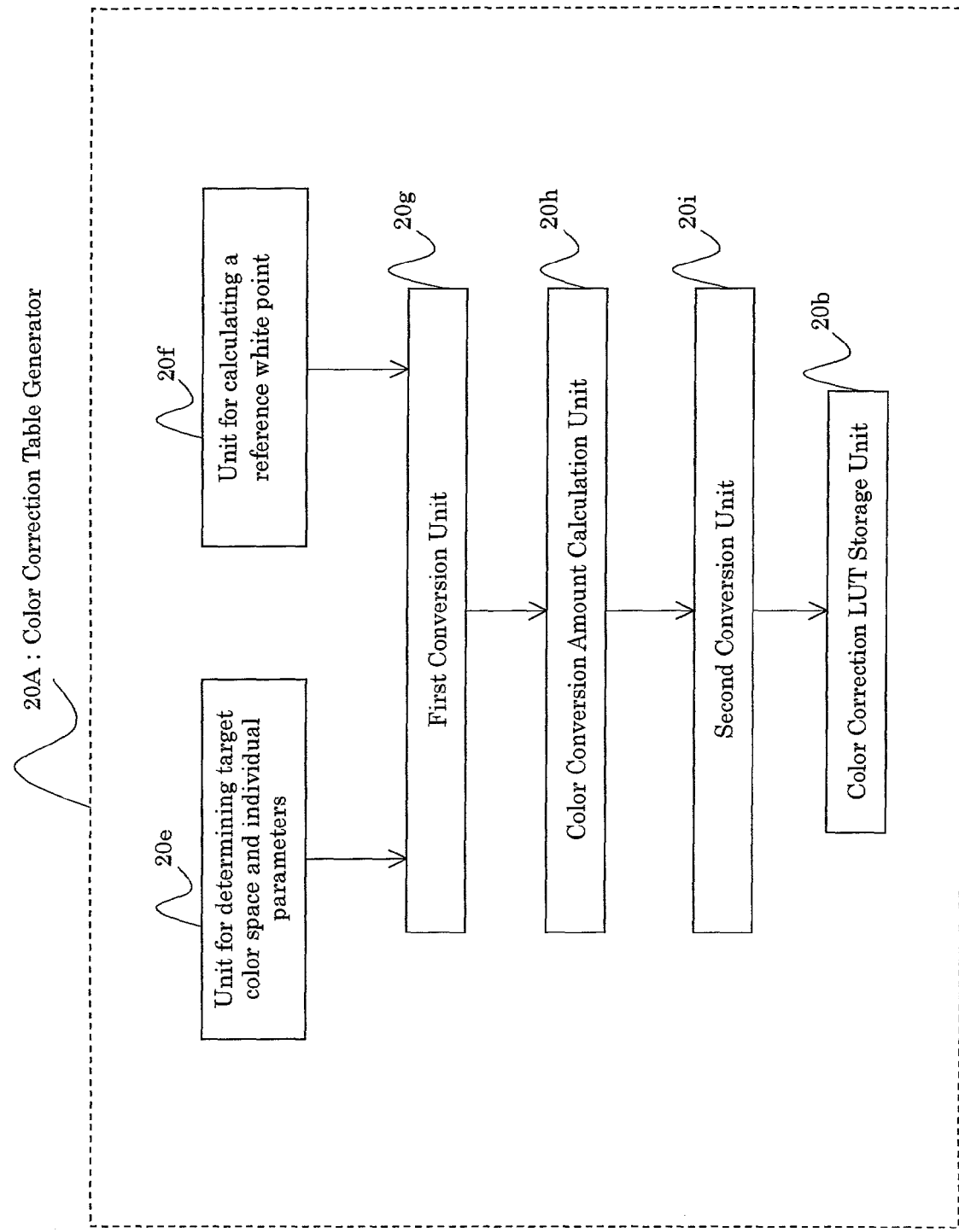
FIG. 1 is a function block diagram of a color correction table generator according to a first embodiment of the present invention.
Figure 3:
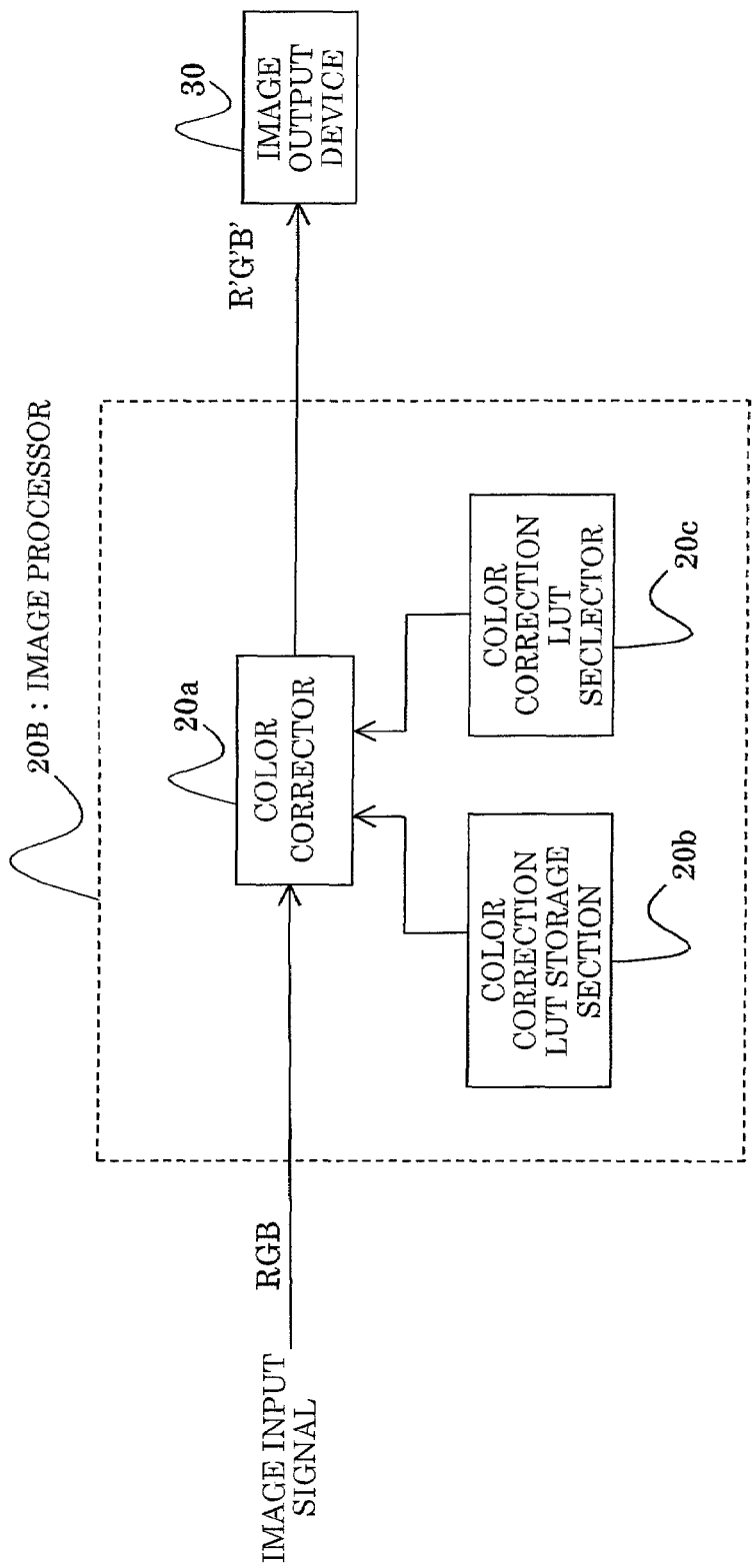
FIG. 3 is a function block diagram of the image processing apparatus according to the first embodiment of the present invention.

FIG. 1 is a function block diagram of a color correction table generator according to a first embodiment of the present invention, and FIG. 3 is a function block diagram of an image processing apparatus according to the first embodiment of the present invention.

Hardware Construction

Figure 2:
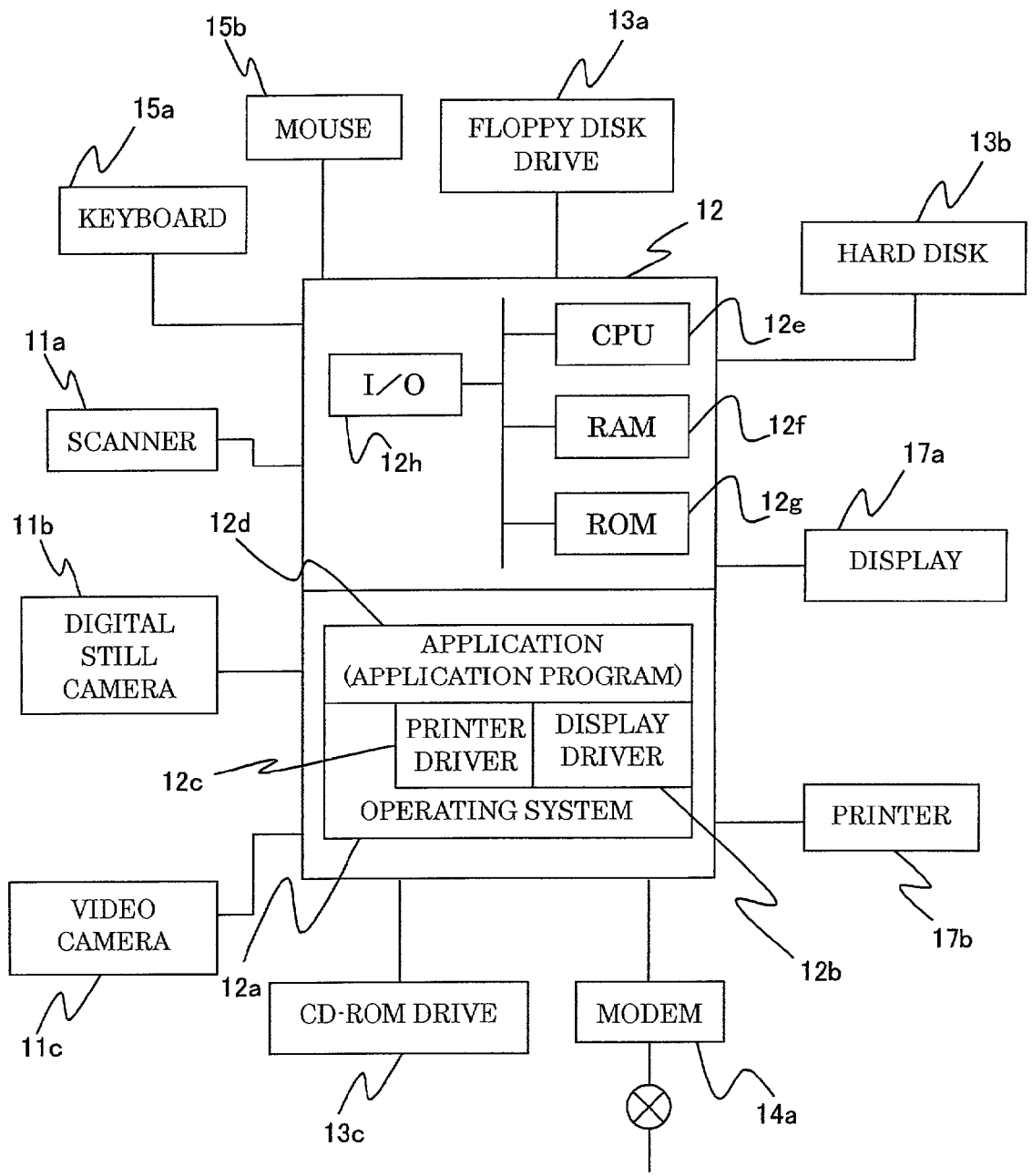
FIG. 2 is a schematic block diagram showing a specific hardware constitution of the color correction table generator and an image processing apparatus of the present invention.

FIG. 2 shows an example of a concrete hardware construction about these the color correction table generating device and the image processing device by an outlined block diagram.

The present embodiment employs a computer system as an example of hardware for realizing the color-correction table generating device and the image processor. FIG. 3 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16.7 million colors by 256-gradation display in three primary colors comprising R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM if required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provided with a display area comprising 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors comprising C, M, Y, and K. As its image resolution, high density print such as 360×360 dpi or 720×720 dpi is available, and as its gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver (DSP DRV) 12b and a printer driver (PRT DRV) 12c are integrated into the operating system 12a. The drivers 12b and 12c depend on the models of display 17a and the color printer 17b, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a or the color printer 17b, which serve as image output devices.

Although in this embodiment the image processor is implemented as a computer system, such a computer system is not always required, but the system to which the image processor is applied may be any other system which requires the image processing of the present invention for the same image data. For example, there may be adopted a system wherein the image processor according to the present invention is built into a digital still camera and printing is performed by a color printer using image data after image processing. In a color printer which inputs and prints image data without going through a computer system, there may be adopted a construction wherein the image processing according to the present invention is performed for image data which are inputted through a scanner, a digital still camera, or a modem, followed by the execution of a printing process.

Of course, the present invention is also applicable to various other devices which handle image data, such as color facsimile devices, color copiers, and projectors.

Image Processing Control Program

The image processing control program according to the present invention is usually distributed in a stored state on a recording medium such as a floppy disk or a CD-ROM so that it can be read by the computer 12. The program is read by a media reader (e.g. CD-ROM driver 13c or floppy disk drive 13a) and is installed in the hard disk 13b. Then, a CPU reads a desired program from the hard disk 13b and executes a desired processing. The image processing control program itself according to the present invention also constitutes a part of the present invention.

Color Correction Table Generator

The color correction table generator 20A shown in FIG. 1 generates a color correction table which can reproduce color characteristics close to target color characteristics as a whole while a high luminance color reproduction gamut of an image output apparatus is efficiently used.

In FIG. 1, the color correction table generator 20A is provided with a unit for determining target color space and individual parameters 20e, a unit for calculating reference white point 20f, a first conversion unit 20g, a color conversion amount calculation unit 20h, and a second conversion unit 20i. Detailed processing of these individual constitution units is described later.

The following section describes a color correction table generation processing program executed by the color correction table generator 20A shown in FIG. 1 while referring to FIG. 5 through FIG. 9. In the present embodiment, description is provided for a case where the image output apparatus is a projector.

It is necessary to measure color characteristics data of the projector described below in advance before executing the color correction table generation processing program.

Namely, the following individual color characteristics data should be measured in advance.

Tristimulus values Xwp, Ywp, Zwp for white (Rd, Gd, Bd)=(255, 255, 255),

Tristimulus values Xrp, Yrp, Zrp for red (Rd, Gd, Bd)=(255, 0, 0),

Tristimulus values Xgp, Ygp, Zgp for green (Rd, Gd, Bd)=(0, 255, 0),

Tristimulus values Xbp, Ybp, Zbp for blue (Rd, Gd, Bd)=(0, 0, 255), and

Tristimulus values Xkp, Ykp, Zkp for black (Rd, Gd, Bd)= (0, 0, 0),

The individual measured data are standardized with respect to the luminance of white (Ywd) using the following expression (1), and an offset at black is subtracted.

[Equation 1] (1)

$$\begin{aligned} X_{wd} &= (X_{wp} - X_{kp})/Y_{wp} \\ Y_{wd} &= (Y_{wp} - Y_{kp})/Y_{wp} \\ Z_{wd} &= (Z_{wp} - Z_{kp})/Y_{wp} \\ x_{wd} &= X_{wd}/(X_{wd} + Y_{wd} + Z_{wd}) \\ y_{wd} &= Y_{wd}/(X_{wd} + Y_{wd} + Z_{wd}) \\ z_{wd} &= Z_{wd}/(X_{wd} + Y_{wd} + Z_{wd}) \end{aligned}$$

While the expression shows the data for white, the same conversion is conducted for R, G and B. For black, (Xkd, Ykd, Zkd)=(0, 0, 0).

Figure 6:
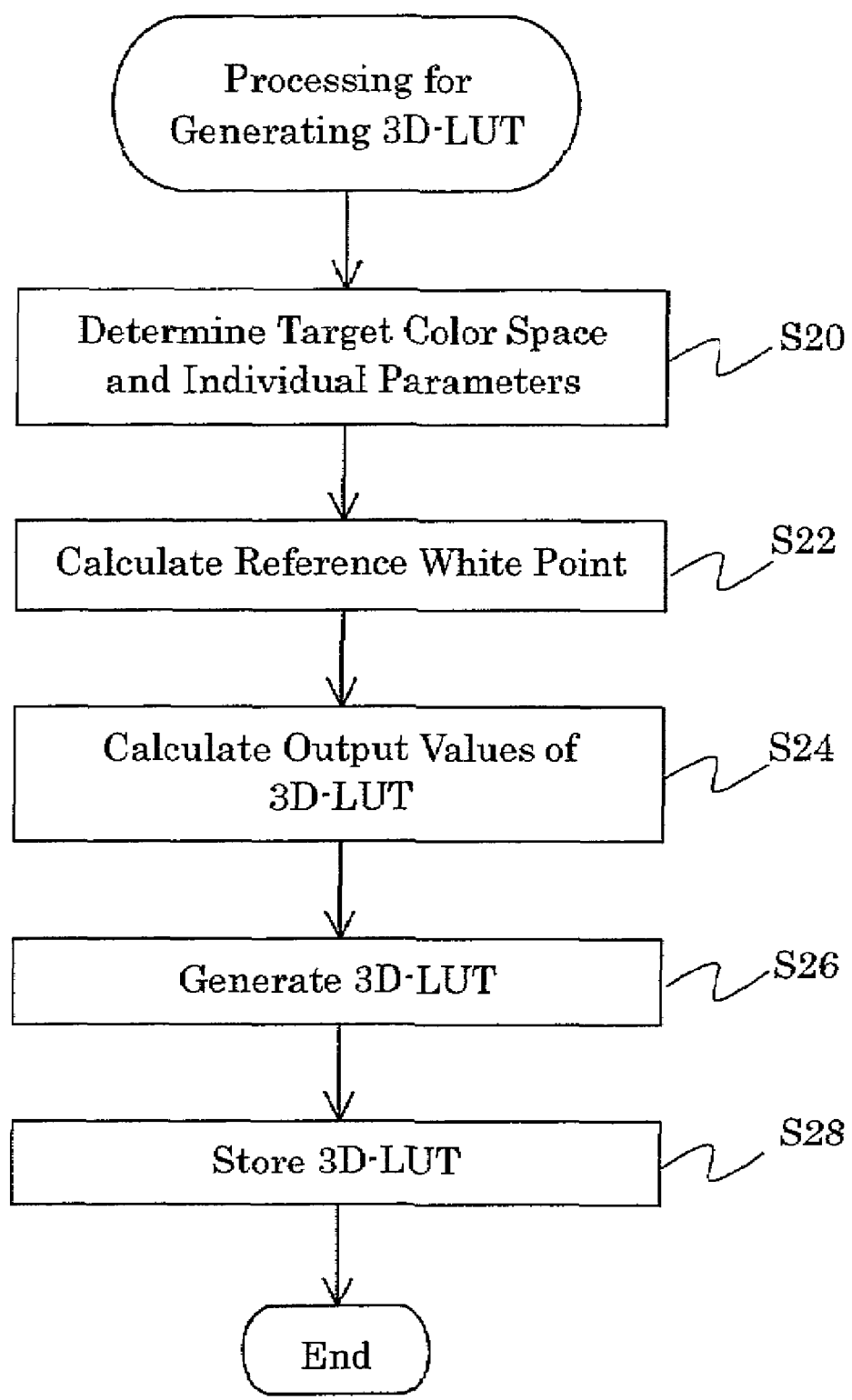
FIG. 6 is a flowchart describing a color correction table generation processing program executed by the first color correction table generator 20A.

FIG. 6 is a flowchart describing a color correction table generation processing program executed by the first color correction table generator 20A.

Processing for determining a target color space and individual parameters (S20)

As shown in FIG. 6, the unit for determining target color space and individual parameters 20e of the first color correction table generator 20A first determines the target color space and the individual parameters in a conversion matrix (S20).

In the present embodiment, the target color space is assumed as sRGB. In this case, based on the definition of sRGB, the individual chromaticity coordinates in the target color space are:

Chromaticity coordinates for white (R, G, B)=(255, 255, 255) are xwt=0.313, ywt=0.329, Chromaticity coordinates for red (R, G, B)=(255, 0, 0) are xrt=0.640, yrt=0.330, Chromaticity coordinates for green (R, G, B)=(0, 255, 0) are xgt=0.300, ygt=0.600, and Chromaticity coordinates for blue (R, G, B)=(0, 0, 255) are xbt=0.150, ybt=0.060.

Then, the unit for determining target color space and individual parameters 20e calculates a matrix Mt which converts RtGtBt to XtYtZt (S20). This conversion is also based on the definition of sRGB, and Mt is a matrix shown in the expression (2).

[Equation 2] (2)

$$M_t = \begin{pmatrix} 0.4124 & 0.3576 & 0.1805 \\ 0.2126 & 0.7152 & 0.0722 \\ 0.0193 & 0.1192 & 0.9505 \end{pmatrix}$$

Then, the unit for determining target color space and individual parameters 20e calculates a matrix Md which converts RdGdBd to XdYdZd (S20). This conversion is based on the color characteristics of the projector, and Md is a matrix shown in the expression (3).

[Equation 3] (3)

$$M_d = \begin{pmatrix} x_{rd} & x_{gd} & x_{bd} \\ y_{rd} & y_{gd} & y_{bd} \\ z_{rd} & z_{gd} & z_{bd} \end{pmatrix} \begin{pmatrix} S_{rd} & 0 & 0 \\ 0 & S_{gd} & 0 \\ 0 & 0 & S_{bd} \end{pmatrix}$$

$$\begin{pmatrix} S_{rd} \\ S_{gd} \\ S_{bd} \end{pmatrix} = \begin{pmatrix} x_{rd} & x_{gd} & x_{bd} \\ y_{rd} & y_{gd} & y_{bd} \\ z_{rd} & z_{gd} & z_{bd} \end{pmatrix}^{-1} \begin{pmatrix} X_{wd} \\ Y_{wd} \\ Z_{wd} \end{pmatrix}$$

Processing for calculating a reference white point (S22)

The unit for calculating reference white point 20f calculates a reference white point such that lightness L* is basically maintained when the target color space and the color of the projector are associated with each other in CIE LUV space (S22). Thus, the reference white point is selected such that the lightness of the reference white point is approximately equal to the lightness of the white of the projector, and the chromaticity of it is approximately the same as a target color temperature when the color reproduction gamut of the projector is represented in the CIE LUV space. The reference white point $X_0$, $Y_0$, and $Z_0$ generated by the color correction table generator 20A of the present embodiment is obtained by the following expression (4):

[Equation 4] (4)

$$\begin{aligned} X_0 &= Y_{wd}(x_{wt}/y_{wt}) \\ Y_0 &= Y_{wd} \\ Z_0 &= Y_{wd}(1 - x_{wt} - y_{wt})/y_{wt} \end{aligned}$$

Processing for calculating output values of the three-dimensional color correction table (S24)

Figure 7:
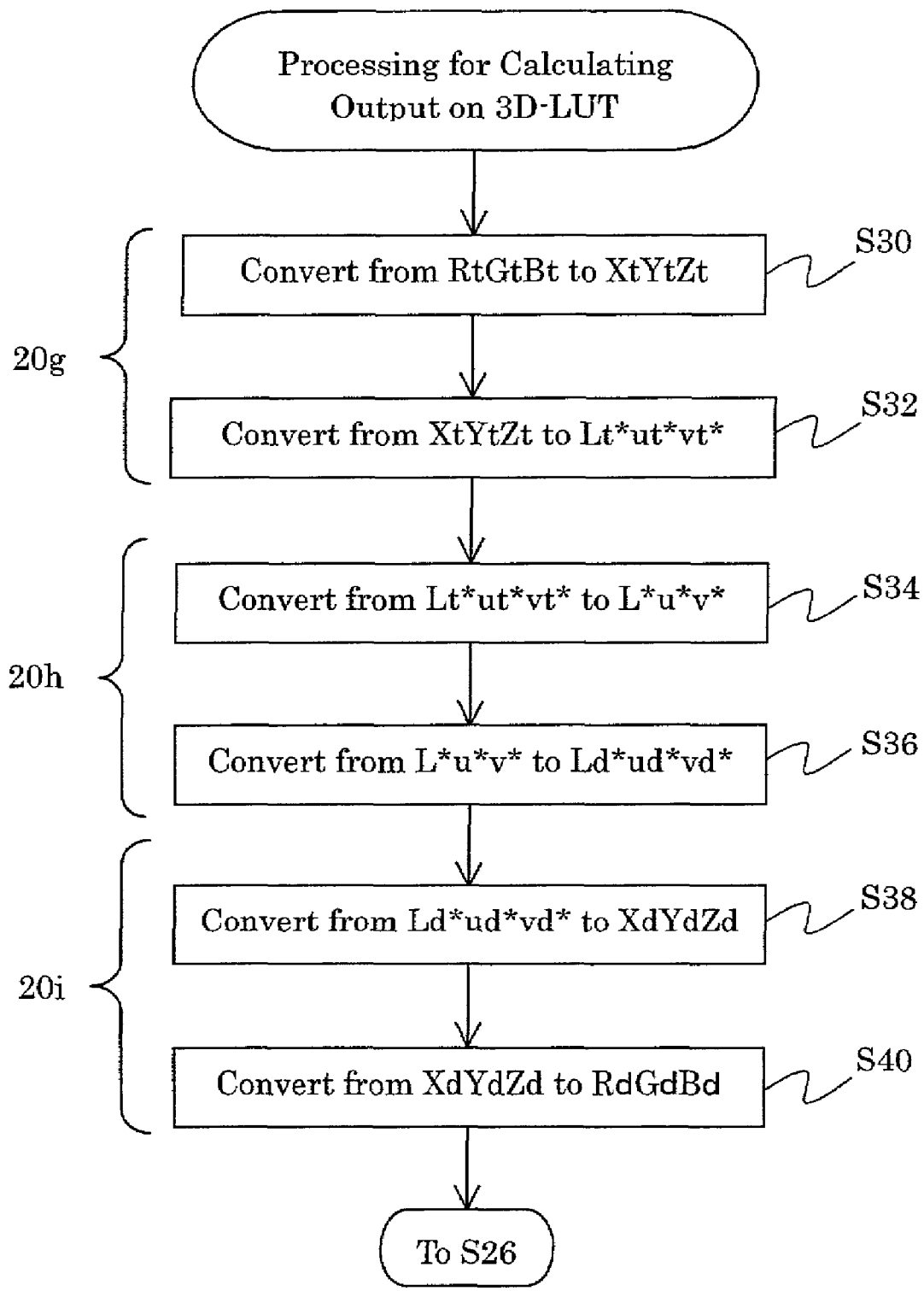
FIG. 7 is a flowchart describing an output value calculation processing program by a three-dimensional color correction table (3D-LUT)

Then, the first conversion unit 20g, the color conversion amount calculation unit 20h, and the second conversion unit 20i in the color correction table generator 20A calculate output values RdGdBd corresponding to the individual input values RtGtBt for the three-dimensional color correction table (3D-LUT) (S24). The output value calculation processing on the three-dimensional color correction table (3D-LUT) is described in more detail while referring to FIG. 7. In FIG. 7, processing in S30 and S32 is conducted by the first conversion unit 20g, processing in S34 and S36 is conducted by the color conversion amount calculation unit 20h, and processing in S38 and S40 is conducted by the second conversion unit 20i.

First, the first conversion unit 20g uses the following expression (5), expression (6), and expression (2) to convert RtGtBt to XtYtZt (S30).

[Equation 5] (5)

$$\begin{aligned}
&\text{When } R_t/255, G_t/255, B_t/255 \leq 0.04045, \\
&\quad r_t = R_t/255/12.92 \\
&\quad g_t = G_t/255/12.92 \\
&\quad b_t = B_t/255/12.92 \\
&\text{When } R_t/255, G_t/255, B_t/255 > 0.04045, \\
&\quad r_t = [(R_t/255 + 0.055)/1.055]^{2.4} \\
&\quad g_t = [(G_t/255 + 0.055)/1.055]^{2.4} \\
&\quad b_t = [(B_t/255 + 0.055)/1.055]^{2.4}
\end{aligned}$$

$$\begin{pmatrix} X_d \\ Y_d \\ Z_d \end{pmatrix} = M_t \begin{pmatrix} r_d \\ g_d \\ b_d \end{pmatrix} \quad (6)$$

This conversion is based on the definition of sRGB.

Then, the first conversion unit 20g uses the following expression (7) to convert from XtYtZt to Lt*ut*vt*(S32).

[Equation 6] (7)

$$\begin{aligned}
L_t^* &= 116(Y_t/Y_{wt})^{1/3} - 16 \quad \text{When } Y_t/Y_{wt} > 0.008856 \\
&= 903.3(Y_t/Y_{wt}) \quad \text{When } Y_t/Y_{wt} > 0.008856 \\
u_t^* &= 13L^*[4X_t/(X_t + 15Y_t + 3Z_t) - 4X_{wt}/(X_{wt} + 15Y_{wt} + 3Z_{wt})] \\
v_t^* &= 13L^*[9Y_t/(X_t + 15Y_t + 3Z_t) - 9Y_{wt}/(X_{wt} + 15Y_{wt} + 3Z_{wt})]
\end{aligned}$$

Figure 5:
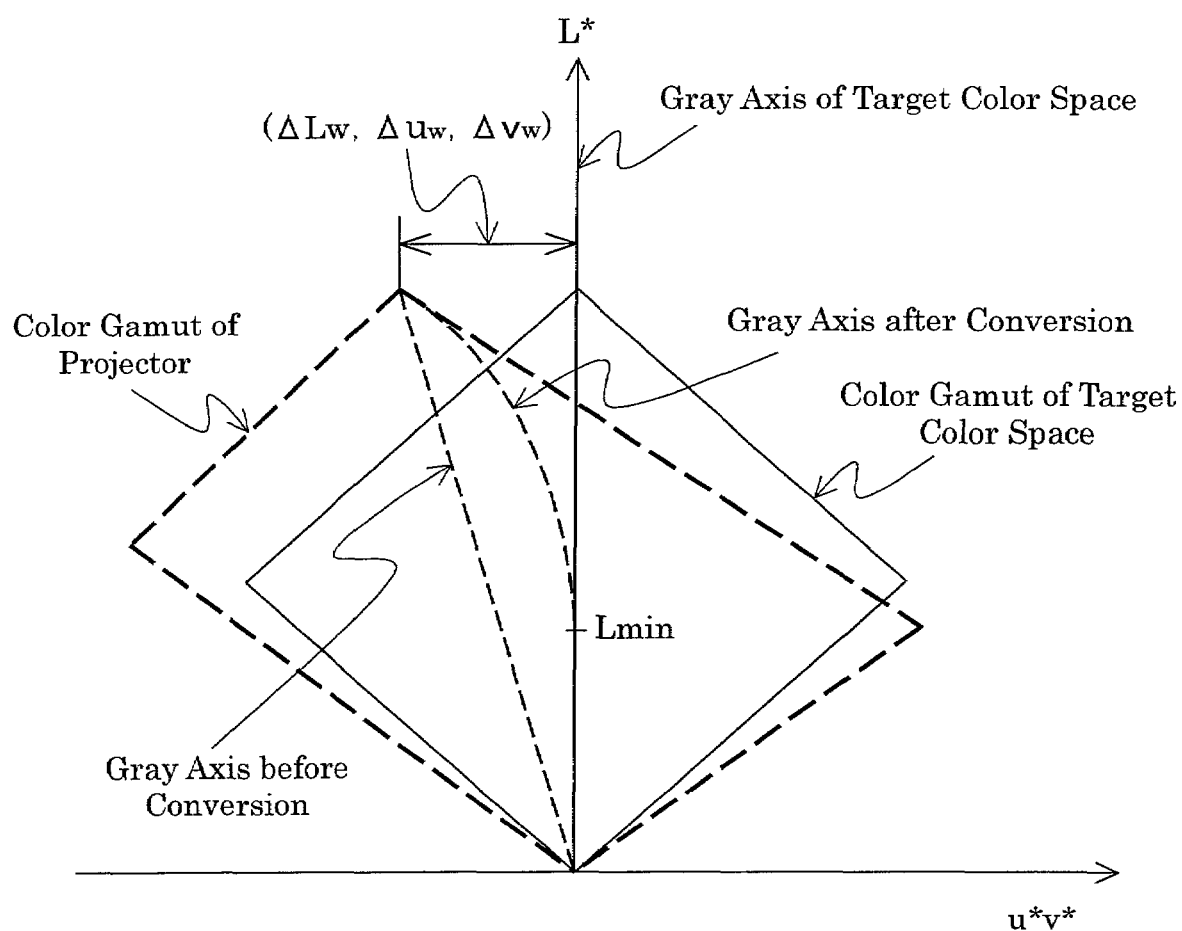
FIG. 5 is a drawing (1) describing a conversion from Lt*ut*vt* to L*u*v*.
Figure 8:
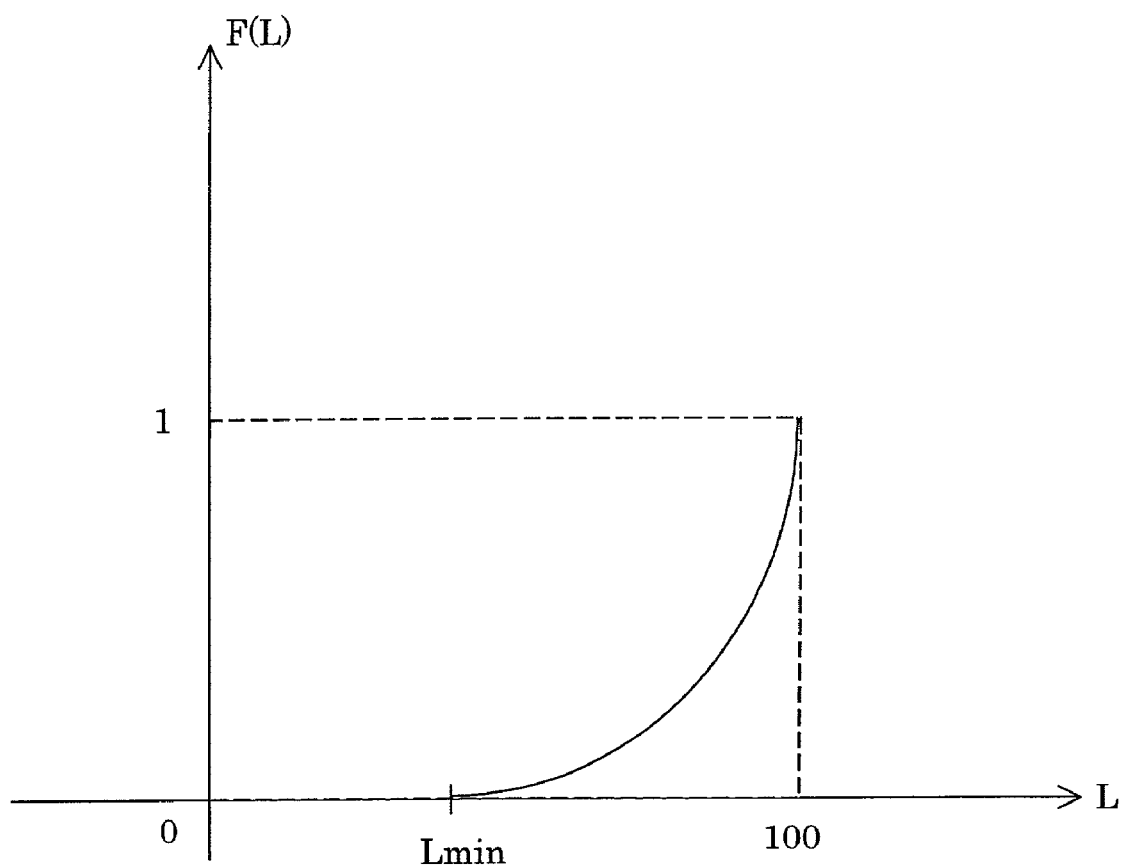
FIG. 8 is a drawing (2) describing a conversion from Lt*ut*vt* to L*u*v*.

Next, the color conversion amount calculation unit 20h converts from Lt*ut*vt* to L*u*v* so as to generate the color correction table which matches the target color characteristics to the color characteristics of the liquid crystal projector when the lightness is low, and provides white which the liquid crystal projector provides as the lightness increases (S34). FIG. 5 and FIG. 8 show drawings describing the conversion from Lt*ut*vt* to L*u*v*. In the following section before and after the conversion from Lt*ut*vt* to L*u*v* are referred to as "before conversion" and "after conversion" respectively.

As shown in FIG. 5, in a color gamut where the lightness L is less than Lmin, a color conversion amount ($\Delta L$, $\Delta u$, $\Delta v$) from before conversion to after conversion is set to zero so as to match the target color characteristics to the color characteristics of the liquid crystal projector. On the other hand, in a color gamut where the lightness L is larger than the lightness Lmin, the color conversion amount ($\Delta L$, $\Delta u$, $\Delta v$) from before conversion to after conversion is gradually increased as the lightness increases. When the lightness of the white of the liquid crystal projector is 100, it is preferable that $0 \leq Lmin \leq 50$.

In this way, a color correction table which can reproduce the color characteristics close to the target color characteristics as a whole can be generated while the high luminance color reproduction gamut of the projector serving as an image output apparatus is efficiently used.

The amount of color conversion ($\Delta L$, $\Delta u$, $\Delta v$) from before the conversion to after the conversion is represented by:

[Equation 7] (8)

$$\begin{pmatrix} \Delta L \\ \Delta u \\ \Delta v \end{pmatrix} = F(L) \begin{pmatrix} \Delta L_w \\ \Delta u_w \\ \Delta v_w \end{pmatrix}$$

where ($\Delta Lw$, $\Delta uw$, $\Delta vw$) is an amount of color conversion for white, and is obtained by:

$\Delta L = Lwd - Lwt$ $\Delta u = uwd - uwt$ $\Delta v = vwd - vwt$ (Lwd, uwd, vwd) and (Lwt, uwt, vwt) are values of (Ld, ud, vd) and (Lt, ut, vt) at the white point in the projector and the target color space respectively. In this way, with the expression (8), an amount of color conversion ($\Delta L$, $\Delta u$, $\Delta v$) for another color is obtained from the amount of the color conversion for white ($\Delta Lw$, $\Delta uw$, $\Delta vw$) according to the lightness.

In the present invention, a function F(L) in the expression (8) is defined as:

[Equation 8] (9)

$$F(L) = \begin{cases} \left(\dfrac{L - L_{\min}}{100 - L_{\min}}\right)^2 & (L > L_{\min}) \\ 0 & (L < L_{\min}) \end{cases}$$

The function F(L) is not limited to the expression (9), and may be an arbitrary function (such as a quadratic function) passing through a point (Lmin, 0) and a point (100, 1) as shown in FIG. 8.

Figure 9:
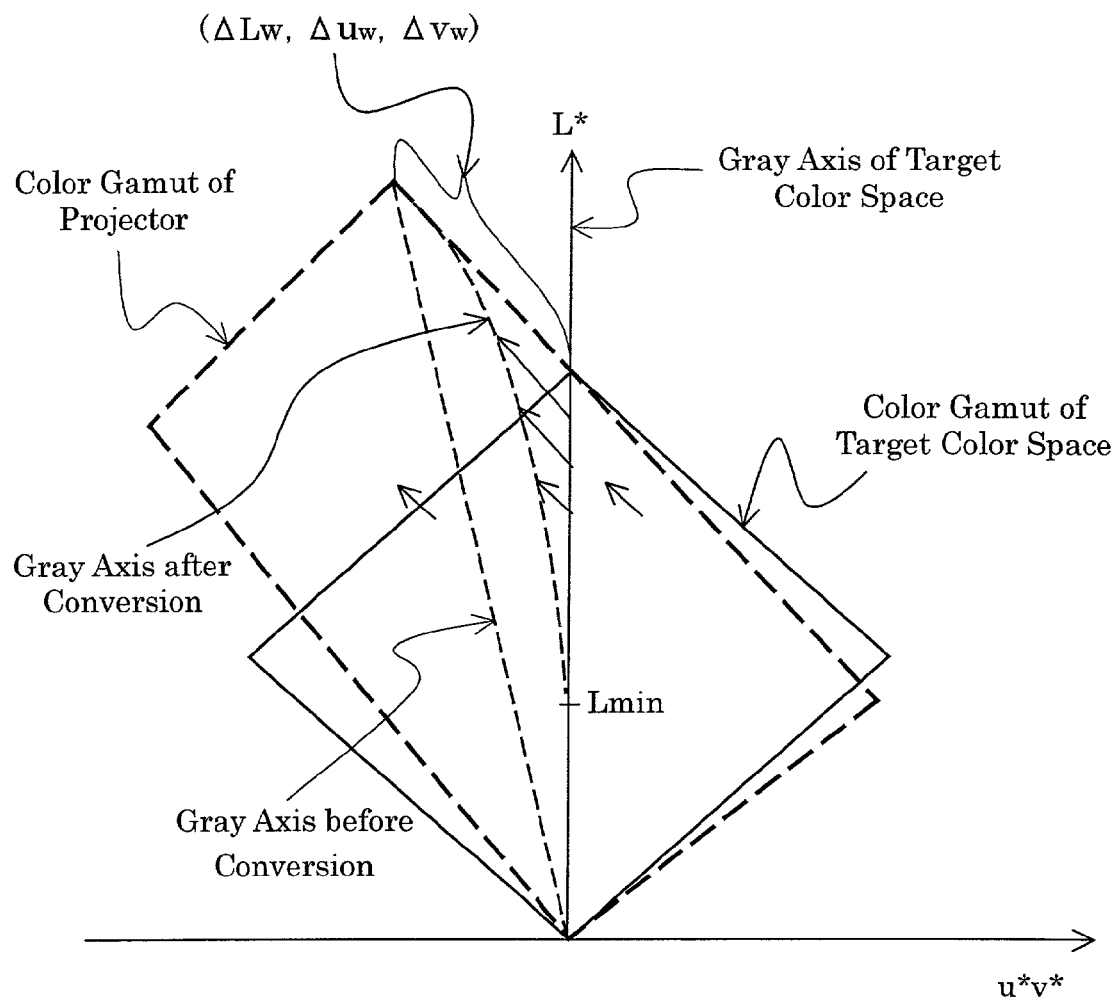
FIG. 9 is a drawing (3) describing a conversion from Lt*ut*vt* to L*u*v*.

While entire color points are moved such that the lightness is equalized as shown in FIG. 5, the converted color points may be moved toward a direction for increasing the lightness as shown in FIG. 9. In this way, these two cases are selectively used for an application.

Figure 10:
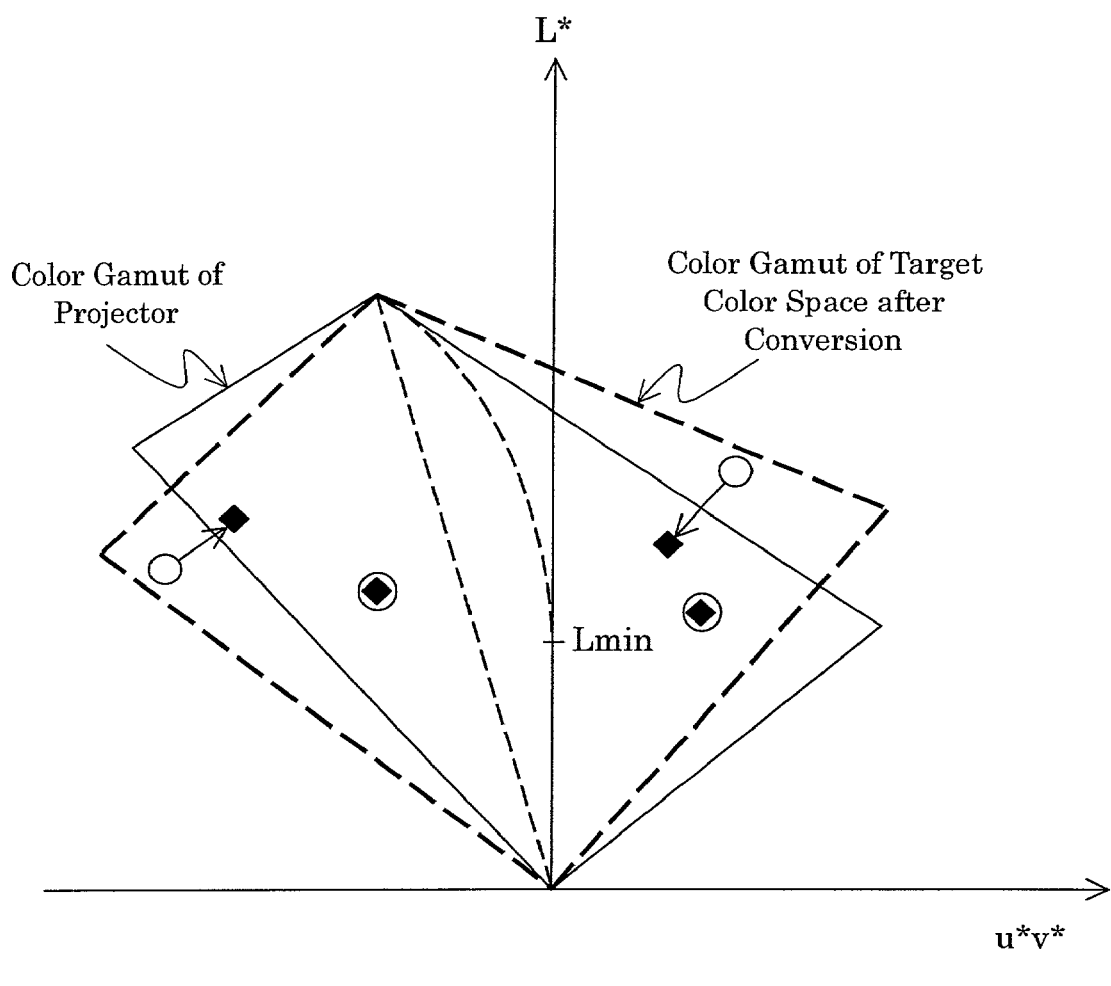
FIG. 10 is a drawing describing a conversion from L*u*v* to Ld*ud*vd*.

As described above, since the amounts of the conversion for the entire colors are determined based on the amount of conversion for white ($\Delta Lw^*$, $\Delta uw^*$, $\Delta vw^*$) when Lt*ut*vt* are converted to L*u*v*, a color converted from a color which is other than white, and has especially high chroma may be moved outside the color gamut of the liquid crystal projector. If this is the case, the color conversion amount calculation unit further converts from L*u*v* to Ld*ud*vd*. This conversion assigns a relatively close color which the projector can represent (such as a color which has the same hue, and is closet on the coordinate system) to the color which exits outside the color gamut of the liquid crystal projector after conversion as shown in FIG. 10.

The second conversion unit 20i uses:

[Equation 9] (13)

$$Y_d = [(L_d^* + 16)/116]^3 Y_n \quad \text{when } L_d^* > 8.000$$
$$= (L_d^*/903.3)Y_n \quad \text{when } L_d^* \leq 8.000$$
$$u_d' = u_d^*/13L_d^* + 4X_n/(X_n + 15Y_n + 3Z_n)$$
$$v_d' = v_d^*/13L_d^* + 9Y_n/(X_n + 15Y_n + 3Z_n)$$
$$X_d = (9u_d'/4v_d')Y_d$$
$$Z_d = [(12 - 3u_d' - 20v_d')/4v_d']Y_d$$

to convert from Ld*ud*vd* to XdYdZd (S38). The values of Xn, Yn, and Zn are values of the reference white point (X$_0$, Y$_0$, Z$_0$) obtained by the expression (4).

Finally, the second conversion unit 20i converts XdYdZd to RdGdBd based on the color characteristics of the projector (S40). The following expressions (14) and (15) are used for the conversion.

[Equation 10] (14)

$$\begin{pmatrix} r_d \\ g_d \\ b_d \end{pmatrix} = M_d^{-1} \begin{pmatrix} X_d \\ Y_d \\ Z_d \end{pmatrix}$$

[Equation 11] (15)

$$R_d = 255 r_d^{1/2.2}$$
$$G_d = 255 g_d^{1/2.2}$$
$$B_d = 255 b_d^{1/2.2}$$

In the expression (14), $M_d^{-1}$ is an inverse matrix of the matrix Md shown in the expression (3). As a result of the calculation, when Rd, Gd, Bd<0, Rd, Gd, and Bd are set to zero, and when Rd, Gd, Bd>255, Rd, Gd, and Bd are set to 255. The obtained Rd, Gd, and Bd are final data for the three-dimensional color correction table.

Then, the procedure returns to S26 in FIG. 6, resultantly the three-dimensional color correction table is generated based on these final data for the three-dimensional color correction table (S26), and this generated three-dimensional color correction table is stored in a color correction LUT storage unit 20b (S28).

As described above, the color correction table which reproduces the color characteristics close to the target color characteristics as a whole can be generated while the high luminance color reproduction gamut of the projector serving as an image output apparatus is efficiently used.

In FIG. 3, the image processing device 20B executes a desired image processing to RGB image input data and outputs the image-processed image data to the image output device 30. Here, the image data is that a color image is divided into predetermined color components and respective components have some proper strength, and the data has a chromatic color or an achromatic color such as gray and black, if it is mixed in predetermined ratio. The present embodiment will be explain in the case where the image output device 30 such as a display reproduces a color based on RGB data.

The image processor 20B is provided with: a color correction LUT storage section 20b which stores at least the color correction table which has been generated by the color correction table generator 20A; and a color corrector 20a which reads a color correction table (LUT) selected by a color correction LUT selector 20c from the color correction LUT storage section 20b and which transforms RGB data into R'G'B' data by reference to the thus-read color correction LUT.

Next, with referring to FIG. 4, the operation of the image processing device 20B is explained hereinafter.

Figure 4:
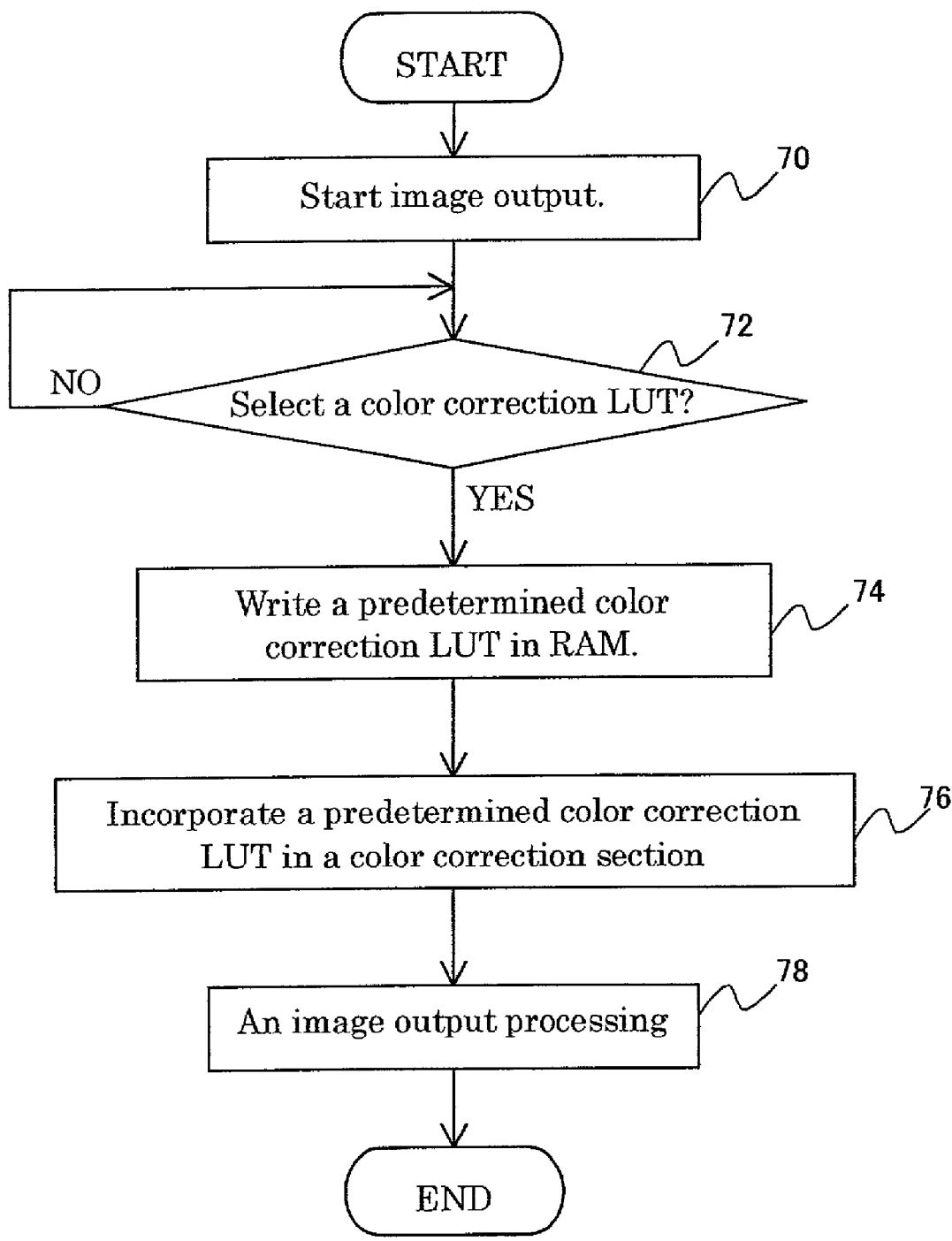
FIG. 4 is a flowchart describing the operation of the image processing apparatus 20B.

As shown in FIG. 4, if the start of an image output is instructed by a user (step 70) and if a three dimensional color correction LUT is selected (step 72, Yes), the selected three dimensional color correction LUT is read out from the color correction LUT storage section 20b and it is written into a RAM (step 74). The three dimensional color correction LUT is incorporated in the color correction section 20a (step 76), an image processing is executed by using an interpolation calculation with referring to the three dimensional color correction LUT, and an image output processing is executed (step 78).

Although this embodiment is constructed so that in step 72 a desired LUT can be selected using the color correction LUT selector 20i in accordance with a desired use of the user.

With the image processing apparatus according to the present embodiment, the color correction is conducted such that the color characteristics close to the target color characteristics as a whole are reproduced while the high luminance color reproduction gamut of the projector serving as an image output apparatus is efficiently used.

What is claimed is:

1. An image processing apparatus for conducting a desired color correction by using a color correction table, comprising a color correction table for providing a color conversion amount according to lightness based on a color conversion amount of white.

2. The image processing apparatus according to claim 1, wherein the color conversion amount decreases as the lightness decreases.

3. The image processing apparatus according to claim 2, wherein the color conversion amount decreases based on a quadratic function as the lightness decreases.

4. The image processing apparatus according to claim 1, wherein the color conversion amount becomes approximately zero when the lightness decreases less than a predetermined value.

5. The image processing apparatus according to claim 4, wherein said predetermined value is less than or equal to 50 when the lightness of white is 100.

6. The image processing apparatus according to claim 1, wherein the color correction by the color correction table is conducted such that a color point is moved toward a direction so as to maintain the lightness.

7. The image processing apparatus according to claim 1, wherein the color correction by the color correction table is conducted such that a color point is moved toward a direction so as to increase the lightness.

8. An image processing method for conducting a desired color correction by using a color correction table for providing a color conversion amount according to lightness based on a color conversion amount of white.

9. A computer-readable medium storing a computer-program of instructions for execution by the computer to perform an image processing for conducting a desired color correction by using a color correction table for providing a color conversion amount according to lightness based on a color conversion amount of white.

10. A computer-readable medium storing a color correction table for providing a color conversion amount according to lightness based on a color conversion amount of white.

* * * * *